UNITED STATES PATENT OFFICE 2,190,673

INSECTICIDAL SPRAY

John W. Orelup, Summit, N. J.

No Drawing. Application December 9, 1937,
Serial No. 178,881

1 Claim. (Cl. 167—43)

This invention relates to petroleum sprays for insecticidal purposes and more particularly to emulsifiers which will cause emulsification of petroleum oils, with a suitable amount of water, to form a spray which is destructive to pests but which does not cause harmful emulsification of plant or vegetable oils, and is accordingly harmless to plants to which it is applied.

Heavy injuries following the use of petroleum emulsions for insecticidal purposes which are known not to result from the quality of the petroleum oil itself have shown that ordinary emulsifiers known to the art such as soap, cresol, albumin and casein, while efficient in emulsifying the petroleum oil of the spray and thus creating a parasite killing mixture, are very dangerous since they are equally effective in emulsifying the plant or vegetable oils. These emulsifiers have been found to produce such injuries as dropping of the leaf and fruit, delaying of the bloom, reduction in the fruit, failure of the fruit to color properly, killing of the twigs, etc. These injuries may appear immediately or over as long a space of time as a year.

In order to avoid such injuries to the plant and still exterminate the pest, it is essential that an emulsifier must not be so effective that oil will be introduced into the leaf and twig structure thereby injuring the plant, nor so ineffective that the oil will collect in large globules which also may cause injury.

For reasons of economy, very small quantities of the emulsifier must be active in use. Furthermore, the character of the emulsion obtained must not change sharply with changes in concentration, that is to say, the degree of emulsion must be achieved over a long ascending scale and not changed sharply in critical concentrations.

The emulsifier must be soluble or miscible with oil so that a satisfactory emulsion is produced suitable for spraying when concentrations of oil and emulsifier solution in water are used which result in high kill of the parasite without injury to the plant and are sufficiently economical for practical commercial use. I have found that concentrations of between ¾ to 1¼% of the solution of emulsifier and oil in water are preferable from the standpoint of effectiveness and general economy in use but higher concentrations may be used effectively.

Extensive tests were conducted on citrus plants under various climatic and geographical conditions in order to determine the effectiveness of the sprays described herein as compared with known sprays.

Twenty four hundred orange and lemon trees were divided into comparative plots. Plots of 10 to 14 trees each were sprayed comparatively with the best known commercial sprays. The spraying was conducted and observed by skilled commercial sprayers. The percentage of kill was observed. Three hundred and thirty four quantitative determinations of the oil depositions were made of the leaves after spraying. The method of Rohrbaugh (Paper No. 285, University of California Graduate School of Tropical Agriculture and Citrus Experiment Station, Riverside, California) was used.

These tests show that penetration and deposits of the oil on the plant are critical and important elements in maintaining healthy plants. It was found that the highest kills of parasites were obtained with sprays depositing the most oil on the plants. However, since large deposits of oil are undesirable, it was found that the ideal emulsifier and spray was one that gave the best percentage kill with the lowest oil deposit and penetration of the plant. This relation may be expressed as a penetration kill index:

$$\text{Penetration kill index} = \frac{\text{Kill \%}}{\text{Oil deposit}}$$

The kill % may be measured by standard methods known to the art and the oil deposit by the above-mentioned method of Rohrbaugh.

I have discovered that sprays having the best kill index are those in which selective emulsifiers were used, the term "selective emulsifier" being employed to designate substances which possess the unique property of being excellent emulsifiers for petroleum or mineral oils but being almost inactive in relation to plant or vegetable oils in the concentrations used. A spray made with an emulsifier having this property can eliminate the pest by means of the killing peroleum oil without introducing the petroleum oil spray into the natural waxes and oils of the plant. The difficulty encountered heretofore in the emulsifiers used in sprays known to the art has been that the great majority of them more effectively emulsify vegetable oils than mineral oils.

From examination of a large number of compounds having some emulsifying properties I have discovered that the property of selective emulsification appears to be conferred by the balance of the polar molecule between its oil and water soluble portions. I have further found that selective emulsification is a particularly characteristic property of such balanced polar compounds in which the water soluble portion of the molecule consists of multiple ether groups.

Thus the condensation product of cocoanut fatty acids with polyethylene glycols of which triethylene or tetraethylene glycol or mixtures of the two have been found to be particularly effective, provides an emulsifying agent which has the proper balance between the oil soluble and water soluble portions and also has a series of multiple ether groups in its water soluble portion. The cocoanut fatty acids are used because they contain substantial proportions of lauric $C_{12}H_{24}O_2$ and myristic $C_{14}H_{28}O_2$ acids. However, any mixture of fatty acids which consists preponderantly of either one or both of these two acids may be suitably used. When used as an emulsifier for petroleum oil sprays, these condensation products have been found to be particularly effective since the petroleum oil emulsion shows a high kill of parasite and, if used in proper concentrations, the spray has little or no effect upon the vegetable oils of the plants. The solution of this condensation product in concentrations running from ¼ of 1% to 5% with a suitable low sulfatable residue type of mineral oil furnishes a spray when mixed in concentrations of approximately ¾ to 1¼% of the oil-emulsifier solution in water, which is satisfactory from an economical standpoint for commercial use and which, while highly destructive to plant parasites, particularly those which attack citrus type plants, is non-injurious to the plants themselves. High concentrations of oil and emulsifier in water have been found to be useful such as compositions wherein the ratio of water content to emulsifying agent is of the order of magnitude of 500 and the emulsifying agent is of the order of 5% of the oil present.

Extensive tests made with these emulsifying agents on vegetable oils such as sesame, corn, cotton, olive, peanut, grass seed, linseed, pine, sunflower, raisin, almond and soya in which 5% of the emulsifier in oil was used and 2% of the combined emulsifier and oil in water, showed no emulsification whatsoever of these various vegetable oils whereas the same concentration of emulsifier with petroleum gives excellent emulsions. The emulsions have the further advantage that they are substantially uninfluenced by hard water or by variations in acidity or alkalinity of the water.

Furthermore, tests have indicated that this pest inhibitor is not substantially changed in effect by climatic conditions. Thus the tests made on citrus plants in humid and dry regions, coastal and inland locations, and at high and medium temperatures, indicated substantially the same effectiveness and absence of destructive action on the plants.

These condensation products may be suitably prepared by condensation of appropriate molal quantities in the usual manner. The use of ten percent excess of glycol results in a much smoother reaction. Thus, 210 grams of cocoanut fatty acids may be combined with 165 grams of triethylene glycol. The two substances may be heated together driving off water with or without the use of a catalyst in a manner well known to the art. If tetraethylene glycol is used, or mixtures of tri- and tetra-, appropriate changes are made in the quantities used.

While the above method has been found entirely satisfactory and efficient, other methods of preparation will suggest themselves, as for example, passing ethylene oxide into the fatty acid mixture under suitable conditions until the appropriate condensation product is formed.

While I have described in detail certain preferred forms of my invention, it is to be understood that changes may be made within the disclosure and the invention embodied in other compounds. I do not, therefore, desire to limit myself to any specific examples set forth but intend to cover my invention broadly in whatever form its principle may be utilized.

I claim:

An anti-parasitic spray for application to plants, comprising an emulsion, with a large excess of water, of mineral oil of low sulfatable residue type, containing as the emulsifying agent a condensation product of approximately molal quantities of cocoanut fatty acids with polyethylene glycols having more than 2, but less than 5 ethylene glycol groups, the ratio of the water content to the emulsifying agent being of the order of magnitude of 500.

JOHN W. ORELUP.